US007260827B1

(12) United States Patent
Sorensen

(10) Patent No.: US 7,260,827 B1
(45) Date of Patent: Aug. 21, 2007

(54) MANUAL MODE METHOD OF TESTING A VIDEO SERVER FOR A VIDEO-ON-DEMAND SYSTEM

(75) Inventor: Craig William Sorensen, Sandy, UT (US)

(73) Assignee: Unisys Corporation, Blue Bell, PA (US)

( * ) Notice: Subject to any disclaimer, the term of this patent is extended or adjusted under 35 U.S.C. 154(b) by 1200 days.

(21) Appl. No.: 09/841,328

(22) Filed: Apr. 23, 2001

(51) Int. Cl.
*H04N 7/173* (2006.01)

(52) U.S. Cl. .......................................... 725/107; 725/88

(58) Field of Classification Search .................. 725/88, 725/82, 91, 93, 101, 107, 114, 115, 116, 86; 714/46; 709/203; 718/105; 702/108, 120, 702/1
See application file for complete search history.

(56) References Cited

U.S. PATENT DOCUMENTS

| | | | | |
|---|---|---|---|---|
| 5,790,794 A | * | 8/1998 | DuLac et al. ............... | 725/115 |
| 5,812,780 A | * | 9/1998 | Chen et al. ................. | 709/224 |
| 5,963,202 A | * | 10/1999 | Polish ......................... | 715/723 |
| 6,449,653 B2 | * | 9/2002 | Klemets et al. ............. | 709/231 |
| 6,449,739 B1 | * | 9/2002 | Landan ........................ | 714/47 |
| 6,687,748 B1 | * | 2/2004 | Zhang et al. ............... | 709/223 |
| 2003/0093801 A1 | * | 5/2003 | Lin et al. ..................... | 725/90 |

* cited by examiner

*Primary Examiner*—Christopher Grant
*Assistant Examiner*—Fred Peng
(74) *Attorney, Agent, or Firm*—Charles J. Fassbender; Charles A. Johnson; Beth L. McMahon

(57) ABSTRACT

A computer simulates a plurality of control terminals, for a video-on-demand system, by which viewers send VCR-like commands to a video server. This simulation includes displaying a set of buttons, on a visual monitor, for manually selecting any one of the simulated control terminals and for manually selecting any one of the VCR-like commands. Output signals are generated from the computer which represent the selected VCR-like command being sent from the selected simulated control terminal. These output signals are coupled to the video server where they are processed in the same manner as signals that are sent from actual control terminals on an actual video-on-demand system.

10 Claims, 12 Drawing Sheets

MANUAL MODE METHOD OF TESTING A VIDEO SERVER FOR A VIDEO-ON-DEMAND SYSTEM

RELATED CASE

The present invention, as identified by the above title and docket number, is related to another invention which is identified as follows: "Script Mode Method Of Testing A video Server For A Video-On-Demand System" having U.S. Ser. No. 09/841,662. Patent applications on both of these inventions were filed concurrently on Apr. 23, 2001, and they have one common Detailed Description.

BACKGROUND OF THE INVENTION

The present invention relates to video-on-demand systems which send multiple streams of video data from a video library to respective sets of viewers. More specifically, the present invention relates to methods of testing video servers in the above video-on-demand systems.

In the prior art, one video-on-demand system is described in U.S. Pat. No. 5,583,561 which is entitled "Multi-Cast Digital Video Server Using Synchronization Groups". An overview of this prior art system is shown in FIG. 1 of patent '561. There, multiple videos are stored in a video library 10 which is coupled to a video server 12; and, the video server 12 is coupled through a network interface circuit 18 and a distribution network 20 to a plurality of video display devices 24 and 26.

To receive a particular video at a particular display device, a request is sent to the video server by a viewer at the display device. This request is sent by means of a control terminal which is coupled to a communication channel that feeds back to the video server. The control terminal in FIG. 1 is a touch-tone telephone; but as an alternative, the control terminal can be a personal computer, or special purpose hardware similar to a handset for remotely controlling a VCR. This is explained at lines 35-45 in column 7 of patent '561.

In response to a viewer's request for a particular video, the video server 12 reads the requested video from the video library 10. Thereafter, that video is sent as a stream of video data from the video server 12 through the network interface circuit 18 to the particular display device that is paired with the control terminal from which the video was requested.

One method for passing the stream of video data from the video server 12, through the network interface circuit and distribution network, to the display device is disclosed in detail in patent '561. Also, an alternative method is disclosed in a pending patent application which has Ser. No. 09/318, 987 and is entitled "Scalable Video System Having Shared Control Circuits for Sending Multiple Video Streams to Respective Sets of Viewers". All of the details in the above patent and patent application are herein incorporated by reference.

While a stream of video data is being sent from the video server to a particular display device, the control terminal for that display device provides a means for sending various VCR-like commands back to the video server. These VCR-like commands include commands such as PAUSE, STOP, PLAY, REWIND or FAST FORWARD. In response, to implement each VCR-like command, the video server 12 performs various steps on the video stream which it is sending to the particular display device. This is illustrated in FIG. 8 of patent '561.

Now, a problem which arises when a new video server is being designed is how to test and check-out the operation of the video server. The direct way to perform such a test is to first build the entire video-on-demand system, and then have viewers at each display device who send the VCR-like commands to the video server through the control terminals for the display devices.

However, a major drawback of the above direct testing method is that the cost to build the entire video-on-demand system can be very large. This large cost occurs in part, because dozens or even hundreds of display devices and control terminals can be coupled to the video server via the distribution network and the feedback communication channel. But, to fully test the video server, it should be tested to its maximum capability.

Accordingly, a primary object of the present invention is to provide a method of testing a video server for a video-on-demand system which is very economical and completely avoids the above problem.

BRIEF SUMMARY OF THE INVENTION

In accordance with the present invention which is claimed herein, a video server for a video-on-demand system is tested by a method which includes the following steps. First, a computer is provided which simulates a plurality of control terminals on a video-on-demand system by which viewers send VCR-like commands to the video server. This simulation includes displaying a set of buttons, on a visual monitor, for selecting any of the simulated control terminals and for selecting any one of the VCR-like commands. Thereafter, an operator chooses one particular simulated control terminal and one particular VCR-like command by pointing a cursor and clicking, via a mouse, on particular buttons that are displayed. Then, in response to the above step, output signals are generated from the computer which represent the one particular VCR-like command being sent from the one particular simulated control terminal. These output signals are coupled to the video server; and there, the signals are processed in the same manner as signals that are sent from actual control terminals on an actual video-on-demand system.

One major feature of the above testing method is that it is very economical in comparison to an alternative direct-testing method wherein the video server is incorporated into an actual video-on-demand system. This economy occurs because the cost of dozens or hundreds of actual control terminals for viewers, in an actual video-on-demand system, is eliminated.

Another major feature of the above testing method is that it completely eliminates the time which takes to actually build a video-on-demand system with dozens or hundreds of control terminals which are coupled to a video server on a feedback channel. Consequently, with the presently claimed testing method, the video server can be fully tested more quickly and brought to market ahead of the competition.

DETAILED DESCRIPTION

Figure 1:
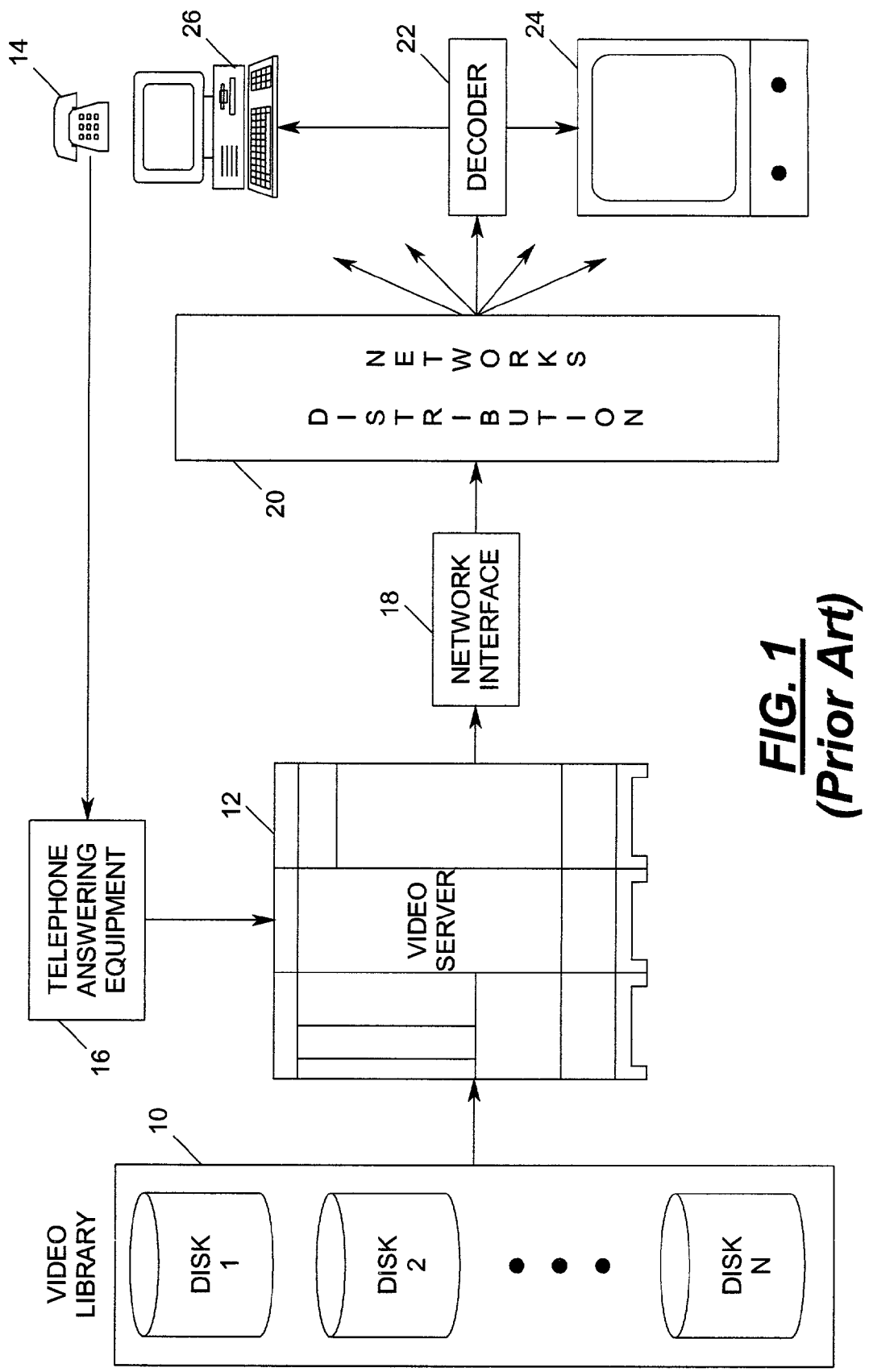
FIG. 1 shows a complete video-on-demand system of the prior art.
Figure 2:
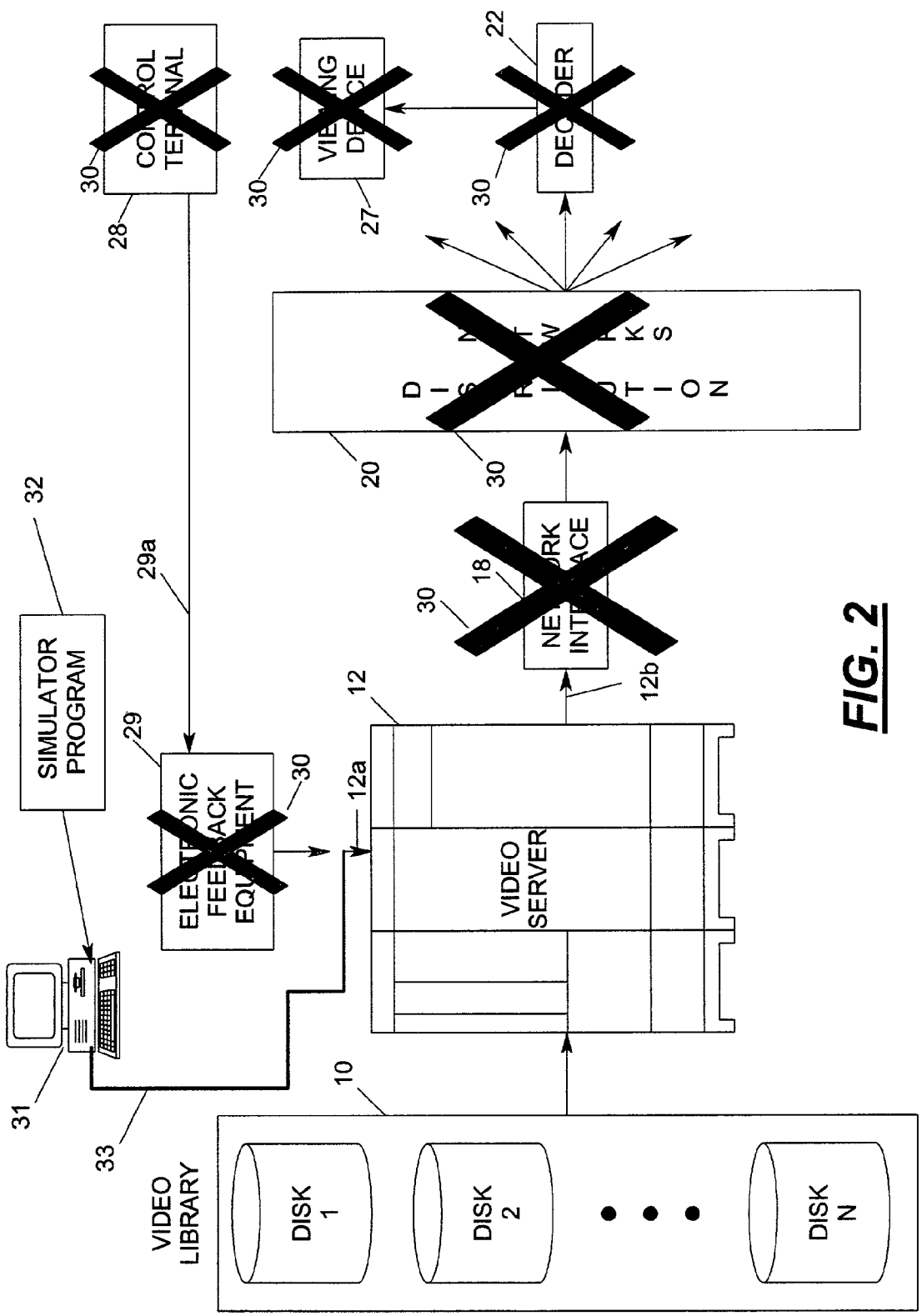
FIG. 2 shows a computer which tests a video server, for the video-on-demand system of FIG. 1, by simulating a plurality of control terminals that send VCR-like commands to the video server, in accordance with the present invention.

Reference should now be made to FIG. 2 wherein all of the items which are included in the previously described video-on-demand system of FIG. 1, are shown in a more generalized form. Each of these items is listed in Table I below.

TABLE I a) Item 10 is a video library.
b) Item 12 is a video server.
c) Item 18 is a network interface circuit.
d) Item 20 is a video distribution network.
e) Item 22 is one of a plurality of decoder circuits that are coupled to the video distribution network 20.
f) Item 27 is one of a plurality of viewing devices, which are coupled thru respective decoders 22 to the video distribution network 20, for selectively receiving a video from the video server 12. These viewing devices include the televisions 24 and personal computers 26 of FIG. 1, as well as any other device which can receive and show a movie from the network 20.
g) Item 28 is one of a plurality of control terminals which are paired with each of the viewing devices 27. By these control terminals 28, VCR-like commands are sent back to the video server 12 to select and control the videos that are sent to the viewing devices 27. These control terminals include the touch-tone TABLE I-continued telephones 14 of FIG. 1, as well as a personal computer or special purpose hardware as was described in the "BACKGROUND OF THE INVENTION".
i) Item 29 is any electronic equipment which couples all of the control terminals 28, thru any feedback communication channel 29a, to the video server 12.

Also in FIG. 2, each of the items 18, 20, 22, 27, 28 and 29 is crossed-out by a large "X" 30. This indicates that when the video server 12 is tested in accordance with the present invention, all of the crossed-out items can be eliminated. Instead, with the present invention as illustrated in FIG. 2, the video server 12 is tested by just a single digital computer 31 which acts as a simulator under the control of a simulator program 32.

Simulator program 32 consists of a sequence of computer instructions which are stored on a media that can be read by the computer 31, such as a magnetic disc or an optical disc. By executing these stored instructions, the computer 30 simulates a plurality of the control terminals 28 that send VCR-like commands to the video server 12. In FIG. 2, these VCR-like commands are sent to the video server 12 over a cable 33 which plugs into a port 12a on the video server that normally receives the same VCR-like commands from actual control terminals on an actual distribution network 20.

With one embodiment of the simulator program 32, the plurality of simulated terminals have a "manual mode" of operation. In this manual mode, any one particular control terminal that is simulated can be selected by an operator of the computer 31; and then, the operator can direct the selected control terminal to send any one particular VCR-like command to the video server 12. How this manual mode of operation is implemented via the computer 31 and simulator program 32 will now be described in detail with reference to FIGS. 3, 4 and 5.

Figure 3:
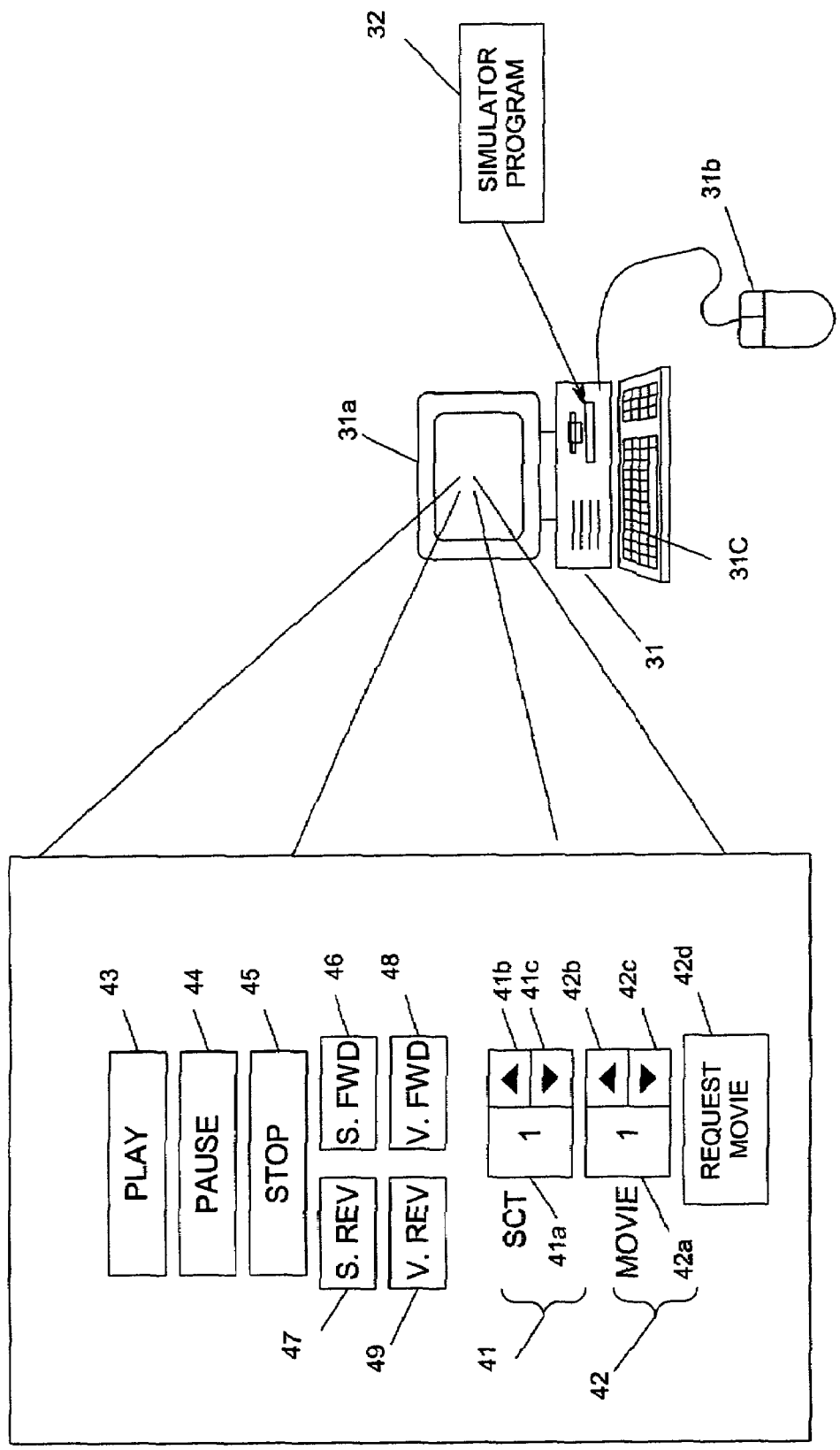
FIG. 3 shows a first set of buttons that are displayed on a visual monitor, by the computer of FIG. 2, during a manual mode of operation in which any one simulated control terminal can be selected to send any one VCR-like command.

Referring first to FIG. 3, it shows a set of buttons 41-49 that are displayed on a visual monitor 31a during the manual mode of operation by the computer 31. These buttons 41-49 provide an interface through which an operator of the computer 31 manually interacts with the simulator program 32. To select any one particular button, the operator of the computer 31 uses a mouse 31b to position a cursor and "click" on that one button.

Button 41 is called "SCT", and it has three parts 41a, 41b, and 41c. Part 41a displays a number which identifies the one particular simulated control terminal SCT(x) that is selected. To increase the number that is displayed in part 41a, the operator of the computer 31 "clicks" on part 41b; and, to decrease the number that is displayed in part 41a, the operator "clicks" on part 41c. One embodiment of the simulator program 32 which was actually built simulated a total of 7200 control terminals, and each simulated control terminal was identified by an integer in part 41a within the range of "1" to "7200".

Button 42 is called "MOVIE", and it has four parts 42a, 42b, 42c, and 42d. Part 42a displays a number which identifies one particular movie M(y) in the video library 10. To increase the number that is displayed in part 42a, the operator of the computer 31 "clicks" on the part 42b; and, to decrease the number that is displayed in part 42a, the operator "clicks" on the part 42c. Then, when the operator "clicks" on the part 42d, a VCR-like command is sent on cable 33 from the simulated control terminal SCT(x) that is currently identified by part 41a. That command requests the video server 12 to obtain the movie M(y) that is currently identified by part 42a, for a particular display device DD(x). The display device DD(x) is not needed to test the video server 12, as is indicated in FIG. 2; but in an actual video-on-demand system, it would be paired with an actual control terminal on the network 20 that corresponds to the simulated control terminal SCT(x).

Button 43 is called "PLAY". When the operator "clicks" on button 43, a VCR-like command is sent on cable 33 from the simulated control terminal SCT(x) which requests the video server 12 to start sending one particular video data stream S(x,y) to its port 12b for the network interface 18. The video data stream S(x,y) is addressed to the above described display device DD(x). Also, video data stream S(x,y) is from the movie M(y) which was previously requested via button 42d from the simulated control terminal SCT(x).

Button 44 is called "PAUSE". When the operator "clicks" on button 44, a VCR-like command is sent on cable 33 which requests the video server 12 to stop sending the above-identified video data stream S(x,y) to the port 12b. Later, an operator may click on another button 43 or 46-49 in order to cause the video server 12 to continue sending the above-identified video data stream S(x,y) to its port 12b.

Button 45 is called "STOP". When the operator "clicks" on button 45, a VCR-like command is sent on cable 33 which requests the video server 12 to stop sending the above-identified video data stream S(x,y) to its port 12b. After the STOP button is clicked, the video stream S(x,y) cannot be restarted by clicking any of the buttons 43 or 46-49.

Button 46 is called "SKIP FORWARD". When the operator "clicks" on button 46, a VCR-like command is sent on cable 33 which requests the video server 12 to temporarily stop sending the above-identified video data stream S(x,y) to its port 12b, and to move an internal pointer forward which points to the part of the video that will be sent next. The amount of the video which is skipped by this movement of the pointer is predetermined. Then, after the pointer is moved, the video server 12 continues to send the above-identified video data stream S(x,y) to the port 12b, at the normal speed in the forward direction.

Button 47 is called "SKIP REVERSE". When the operator "clicks" on button 47, a VCR-like command is sent on cable 33 which requests the video server 12 to temporarily stop sending the above-identified video data stream S(x,y) to its port 12b, and to move the above internal pointer backward within the video server 12. The amount of the video which is skipped by this movement of the pointer is predetermined. Then, after the pointer is moved, the video server 12 continues to send the above-identified video data stream S(x,y) to the port 12b at the normal speed in the forward direction.

Button 48 is called "VIEW FORWARD". When the operator "clicks" on button 48, a VCR-like command is sent on cable 33 which requests the video server 12 to send the above-identified video data stream S(x,y) to the port 12b at a fast viewing speed in comparison to the normal "PLAY" speed under button 43. The video server 12 will continue to send the video data stream S(x,y) to the port 12b at this fast viewing speed until it receives another VCR-like command on cable 33 for that same video data stream.

Button 49 is called "VIEW REVERSE". When the operator "clicks" on button 49, a VCR-like command is sent on cable 33 which requests the video server 12 to send the above-identified video data stream S(x,y) to its port 12b in a reverse direction and at a fast viewing speed as discussed above. The video server 12 will continue to send the video data stream S(x,y) to the port 12b at this fast viewing speed until it receives another VCR-like command on cable 33 for that same video data stream.

Figure 4:
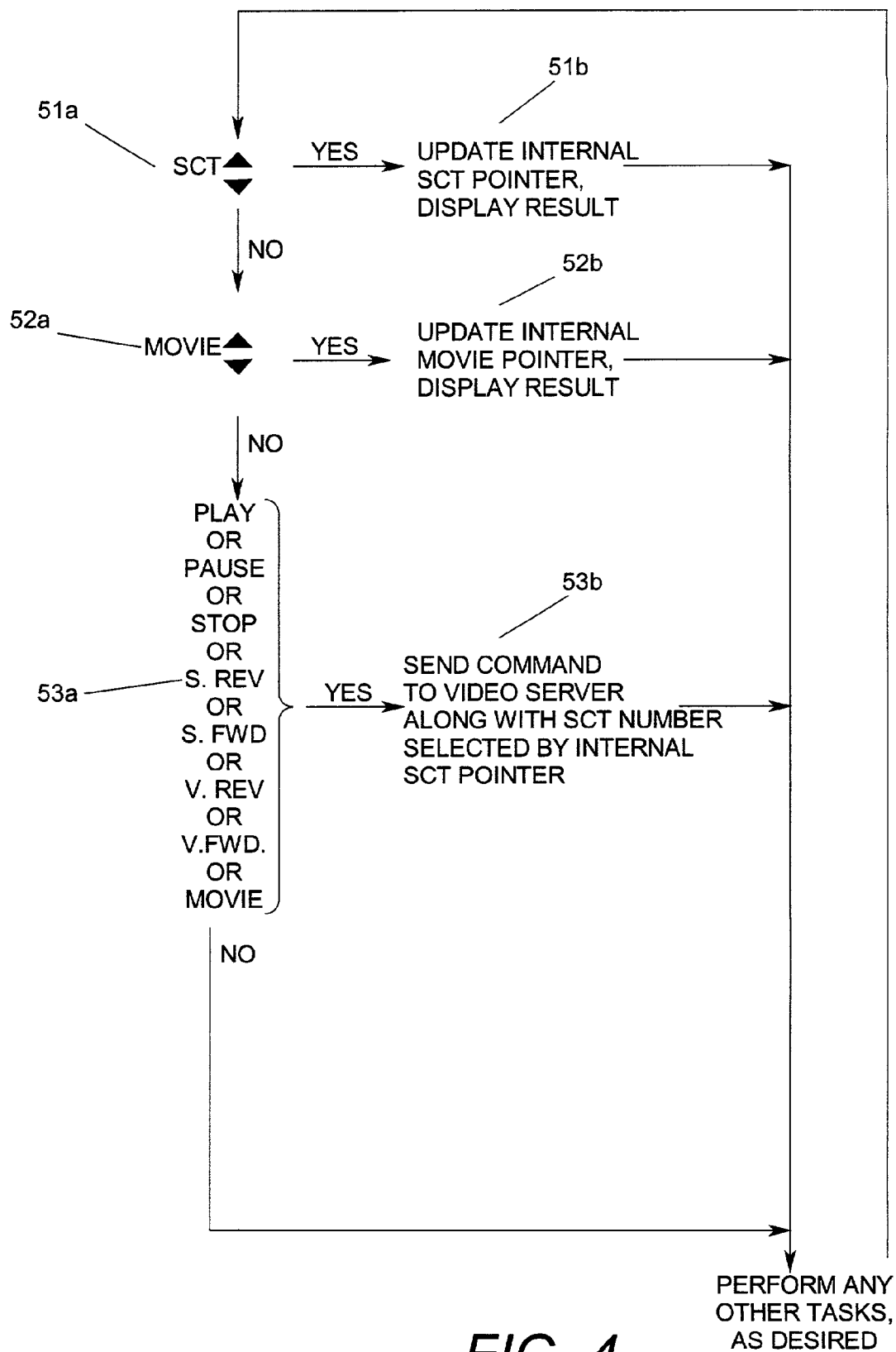
FIG. 4 shows various steps which are performed by the computer of FIG. 2 in response to an operator using the buttons that are shown in FIG. 3.

All of the above operations, which are initiated via buttons 41-49 in FIG. 3, are illustrated in a flow chart form in FIG. 4. There, six steps 51a, 51b, 52a, 52b, 53a, and 53b are repeated over and over in a loop. These steps are performed by the computer 31 under the direction of the simulator program 32.

In step 51a, the computer 31 senses whether button 41b or 41c is being "clicked". If the "yes" path is taken, then computer 31 performs step 51b wherein it updates an internal pointer which selects one of the simulated control terminals SCT(x). Then, the number in that internal pointer is displayed by part 41a of FIG. 3. Also, the number of any movie which is currently assigned to the simulated control terminal SCT(x) is displayed by part 42a, and one of the buttons 43-49 is lit to indicate the last command that was sent from the simulated control terminal SCT(x).

In step 52a, computer 31 senses whether button 42b or 42c is being "clicked". If the "yes" path is taken, then computer 31 performs step 52b wherein it updates a number in an internal pointer which identifies the movie that is assigned to the simulated control terminal SCT(x). Also, the number in that pointer is displayed in part 42a.

In step 53a, the computer 31 senses whether any of the buttons 42d and 43-48 are being "clicked". If the "yes" path is taken, then computer 31 performs step 53b wherein it sends the VCR-like command, on cable 33, which corresponds to the button that was "clicked". This command is sent from the simulated control terminal SCT(x) that was last selected by step 51b.

Figure 5:
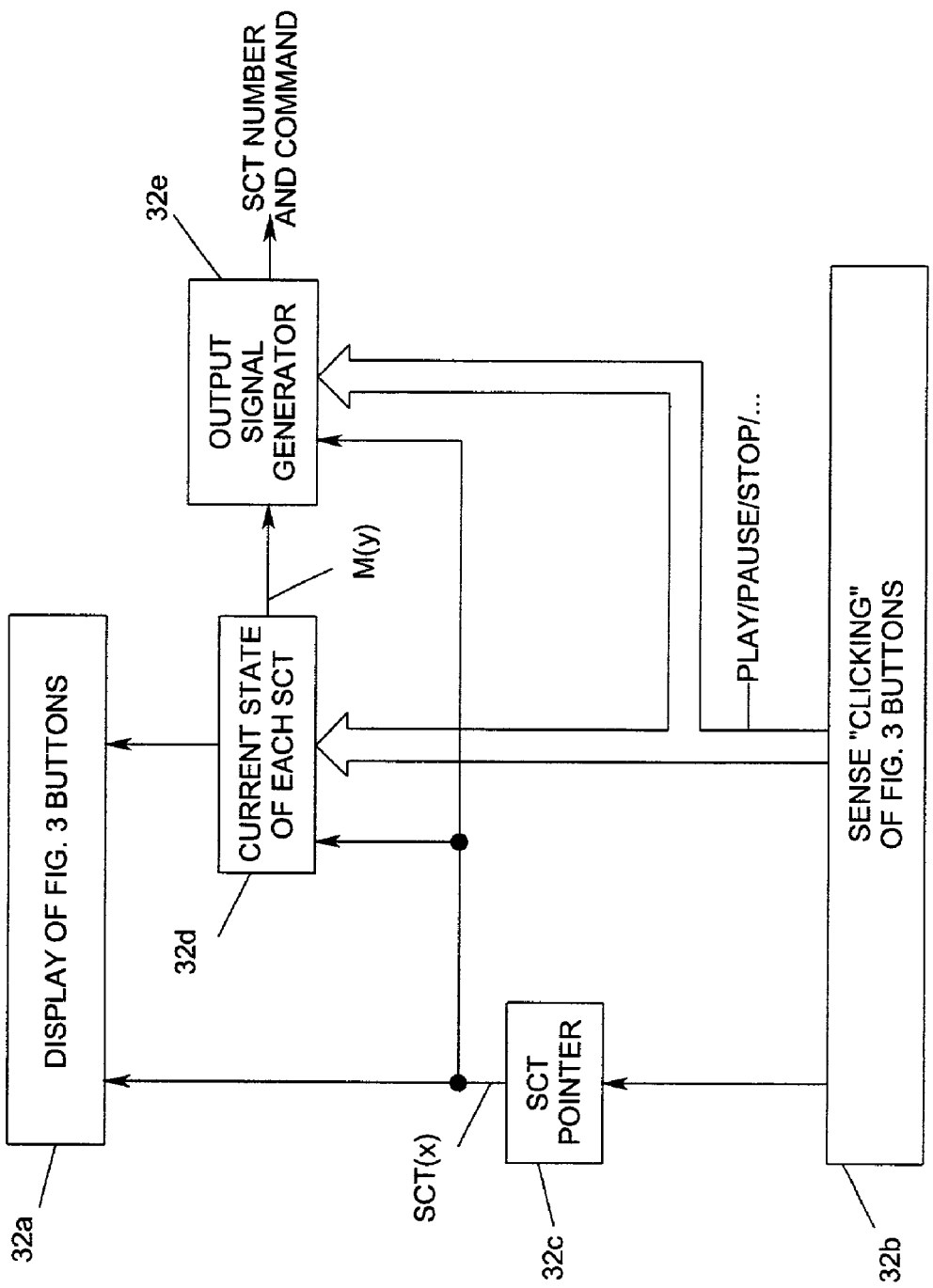
FIG. 5 shows the structure of a program in the computer of FIG. 2 which performs the steps that are shown in FIG. 4.

Referring now to FIG. 5, an overall structure for the simulator program 32 will be described which performs all of the steps of FIG. 4. In this FIG. 5 structure, the major components of the simulator program 32 are identified by reference numerals 32a thru 32e. Each of these program components is described below in TABLE 2, and these components are intercoupled to each other as shown in FIG. 5.

TABLE 2 a) Component 32a is a portion of the simulator program 32 which displays all of the buttons 41-48 on the monitor 31a, as shown in FIG. 3.
b) Component 32b is a portion of the simulator program 32 which senses when any one of buttons 41-48 is being "clicked", as previously described in conjunction with steps 51a, 52a, and 53a of FIG. 4.
c) Component 32c is a pointer which holds a number that identifies a particular one of the simulated control terminals SCT(x). The number in this pointer is an integer which is incremented by one when button 41b is "clicked" and decremented by one when button 41c is "clicked".
d) Component 32d is a portion of the simulator program 32 which stores the current state of each simulated control terminal. This current state identifies the particular movie which was assigned last to the simulated control terminal and the VCR-like command that was sent last from the simulated control terminal. The current state for one particular simulated control terminal SCT(x) is selected by pointer 32c, and that state is indicated on the monitor 31a by the buttons that are lit. Also, component 32d changes the current state of the simulated control terminal SCT(x) in response to the buttons 41-49 that are "clicked", as sensed by component 32b.
e) Component 32e is a portion of the simulator program 32 which sends the VCR-like commands to cable 33. Thus, component 32e performs step 53b in FIG. 4. Each VCR-like command on cable 33 is accompanied by the number, from pointer 32c which

TABLE 2-continued identifies the particular simulated control terminal SCT(x) that is sending the command. These commands are sent in response to the buttons 41-49 that are "clicked", as sensed by component 32b.

One preferred embodiment of the simulator program 32, which simulates a plurality of control terminals in a "manual" mode of operation, has now been described in detail. Now, with reference to FIGS. 6-11, another preferred embodiment of the simulator program 32 will be described which simulates a plurality of control terminals in a "SCRIPT" mode of operation.

In the script mode of operation, multiple scripts are stored in a memory. Here, each script specifies a selectable sequence of VCR-like commands and selectable time spacings between the commands. Later, in the script mode of operation, respective scripts from the memory are assigned to a set of simulated control terminals for a video-on-demand system. Thereafter, in the script mode of operation, output signals are generated from the simulated control terminals, which include the commands with the time spacings in the scripts that were previously assigned to the simulated control terminals. These output signals are coupled to the video server 12 over cable 33 of FIG. 2, just like the output signals are coupled to the video server 12 in the manual mode of operation.

To implement the script mode of operation, the computer 31 displays three sets of buttons 61-62, 71-72, and 81-86 on the visual monitor 31*a*. These buttons provide an interface through which an operator of the computer 31 manually interacts with the simulator program 32. To select any one particular button, the operator of the computer 31 uses the mouse 31*b* to position a cursor and "click" on that one button.

Button 61 is called "SELECT SCRIPT", and it has three parts 61*a*, 61*b*, and 61*c*. Part 61*a* displays a number which identifies the one particular script S(z) that is selected. To increase the number that is displayed in part 61*a*, the operator of the computer 31 "clicks" on part 61*b*; and, to decrease the number that is displayed in part 61*a*, the operator "clicks" on part 61*c*. One embodiment of the simulator program 32 which was actually built had a total of ten different scripts, and each script was identified by an integer in part 61*a* within the range of "1" to "10".

Button 62 is called "EDIT SCRIPT", and it has five parts 62*a*, 62*b*, 62*c*, 62*d* and 62*e*. When part 62*a* is "clicked" by the operator of the computer 31, then part 62*b* displays a portion of the one particular script S(z) that is selected by button 61. To scroll upward the portion of script S(z) that is displayed in part 62*b*, the operator of the computer 31 "clicks" on part 62*c*; and, to scroll downward the portion of the script S(z) that is displayed in part 62*b*, the operator "clicks" on part 62*d*.

Figure 6:
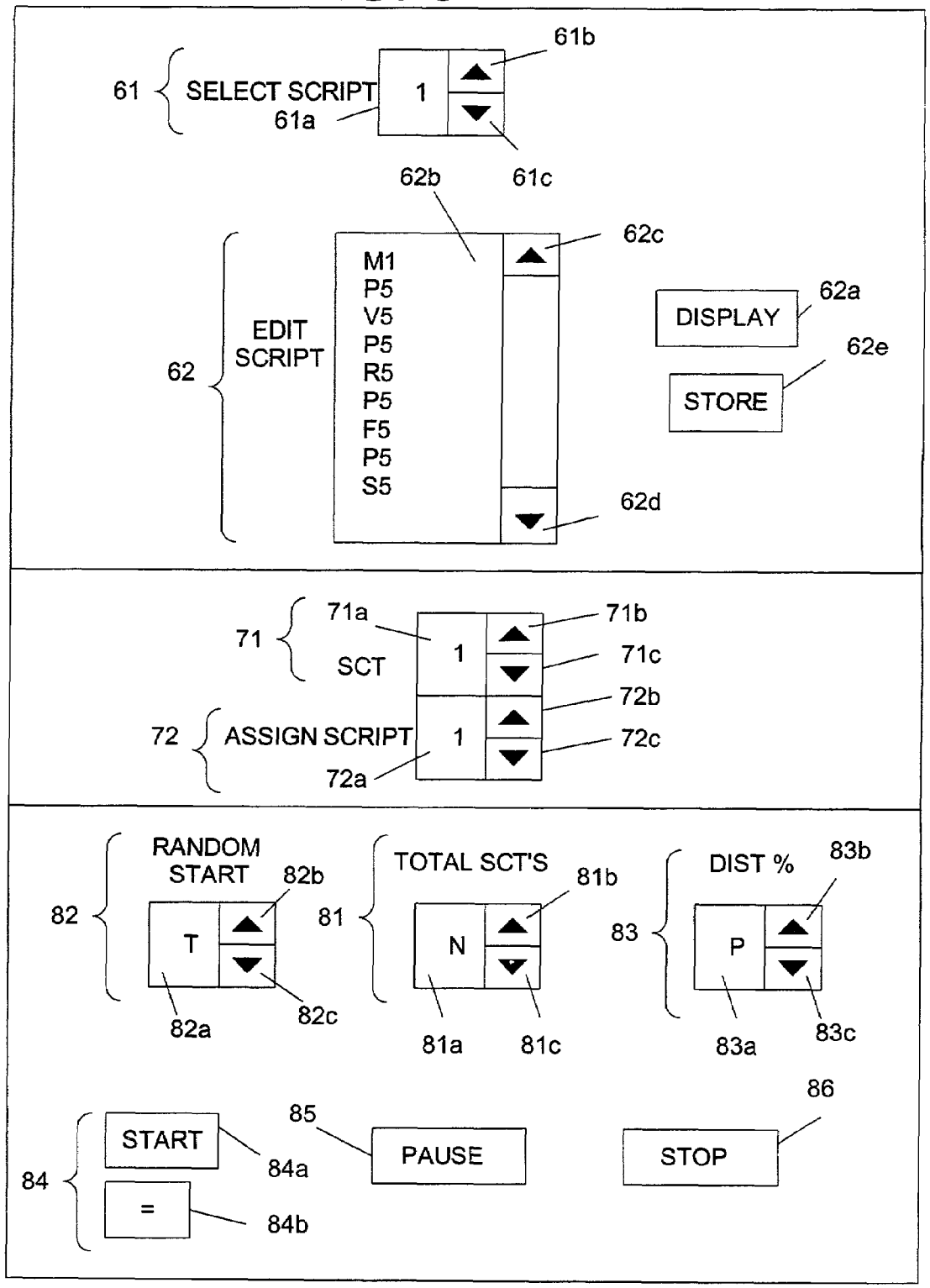
FIG. 6 shows a second set of buttons that are displayed on the visual monitor by the computer of FIG. 2, during a script mode of operation in which multiple simulated control terminals concurrently send respective sequences of the VCR-like commands.

Within part 62*b* of FIG. 6, a portion of the first script S(1) is illustrated as an example. In this example, the script S(1) consists of the following series of command-time pairs: M1, P5, V5, P5, R5, P5, F5, P5, S5. Here, each letter specifies one VCR-like command, and each number specifies the time in seconds between the command of one pair and the command of the next pair in the series. All of the letters which can be used to specify a VCR-like command, in any command-time pair of any script, are described below in TABLE 3.

TABLE 3

1) Letter "P" specifies a "PLAY" command, which is the same as the PLAY command that is sent via button 43 of FIG. 3 in the manual mode of operation.
2) Letter "A" specifies a "PAUSE" command, which is the same as the PAUSE command that is sent via button 44 of FIG. 3 in the manual mode of operation.
3) Letter "S" specifies a "STOP" command, which is the same as the STOP command that is sent via button 45 of FIG. 3 in the manual mode of operation.
4) Letter "F" specifies a "SKIP FORWARD" command, which is the same as the SKIP FORWARD command that is sent via button 46 of FIG. 3 in the manual mode of operation.
5) Letter "B" specifies a "SKIP REVERSE" command, which is the same as the SKIP REVERSE command that is sent via button 47 of FIG. 3 in the manual mode of operation.
6) Letter "V" specifies a "VIEW FORWARD" command, which is the same as the VIEW FORWARD command that is sent via button 48 of FIG. 3 in the manual mode of operation.
7) Letter "R" specifies a "VIEW REVERSE" command, which is the same as the VIEW REVERSE command that is sent via button 49 of FIG. 3 in the manual mode of operation.
8) Letter "M" specifies a "REQUEST MOVIE" command, which is the same as the REQUEST MOVIE command that is sent via button 42d of FIG. 3 in the manual mode of operation.

Button 62*e* is called "STORE", and it is used to store any desired command-time pair sequence as a new script, and to store modifications to any previously stored script. To modify a particular command-time pair in one previously entered script S(z), the operator of the computer 31 first selects that script S(z) via button 61. Then the operator uses buttons 62*c* and 62*d* to display, in part 62*b*, the command-time pair that is to be modified. Next, the operator uses the mouse 31*b* to position a cursor, in the monitor 31*a*, on the command-time pair that is to be modified; and then the operator uses the keyboard 31*c* of the computer 31 to type-in the new command-time pair.

Additional command-time pairs are modified by moving the cursor onto each such pair and typing-in the modification. Similarly, new command-time pairs are added to the end of a script by moving the cursor to the point immediately below the last command-time pair and typing in the new command-time pair. After all such modifications are made, the operator "clicks" on button 62*e* to store the script S(z), as modified within the simulator program 32.

Similarly, to store a completely new script into the simulator program 32, the operator of the computer 31 first uses button 61 to select a number which will identify the new script S(z). Then, the operator "clicks" on button 62*a*; and then the operator uses the mouse 31*b* and keyboard 31*c* to enter each command-time pair. After the entire new script S(z) has been typed-in, the operator then "clicks" on button 62(*e*).

Button 71 is called "SCT", and it has three parts 71*a*, 71*b*, and 71*c*. Part 71*a* displays a number which identifies the one particular simulated control terminal SCT(x) that is selected. To increase the number that is displayed in part 71*a*, the operator of the computer 31 "clicks" on part 71*b*; and, to decrease the number that is displayed in part 71*a*, the operator "clicks" on part 71*c*. One embodiment of the simulator program 32 which was actually built simulated a total of 7200 control terminals, and each simulated control terminal was identified by an integer in part 71*a* within the range of "1" to "7200".

Button 72 is called "ASSIGN SCRIPT"; and it has three parts, 72*a*, 72*b*, and 72*c*. Part 72*a* displays a number that identifies the script that is currently assigned to the simulated control terminal SCT(x). To increase the number of the script which is assigned to the simulated control terminal SCT(x), the operator of the computer 31 "clicks" on part 72*b*; and to decrease the number of the script which is assigned to the simulated control terminal SCT(x), the operator "clicks" on part 72*c*.

Thus, by using all of the above-described buttons 61-62 and 71-72, an operator of the computer 31 can define and store multiple scripts within the simulator program 32; and, the operator of the computer 31 can selectively assign a respective script to each one of a plurality of control terminals that are simulated by the simulator program 32. Then, after the scripts are assigned, buttons 81-86 are used to actually run the simulated control terminals in the script mode.

Button 81 is called "TOTAL SCT'S", and it has three parts 81*a*, 81*b*, and 81*c*. Part 81*a* displays a number "N" which limits the total number of the simulated control terminals that will be allowed to send commands to the video server 12. These particular simulated control terminals which will send commands are SCT(1) through SCT(N). Part 81*b* is "clicked" on by the operator of the computer 31 to increase the number "N" that is displayed in part 81*a*; and, part 81*c* is "clicked" on to decrease the number "N" that is displayed. Thus, the buttons 61-62 and 71-72 can be used to assign scripts to a large number of simulated control terminals; and button 81 can be used to select subsets of those simulated control terminals that are allowed to send commands to the video server 12.

Button 82 is called "RANDOM START", and it has three parts 82*a*, 82*b*, and 82*c*. Part 82*a* displays a time interval "T" in seconds, during which the simulated control terminals SCT(1) through SCT(N) send the first command of their script to the video server 12. For each particular simulated control SCT(1) through SCT(N), the time at which the first command is sent is randomly selected within the interval "T". To increase the time interval "T", the operator of the computer 31 "clicks" on part 82*b*, and to decrease the time interval "T", the operator "clicks" on part 82*c*.

Button 83 is called "DIST. %", and it has three parts 83*a*, 83*b*, and 83*c*. Part 83*a* displays a percentage "P" by which the specified time in each command-time pair of each script can be automatically altered by the simulator program 31. If the percentage "P" is set equal to zero, then no alteration occurs. If the percentage "P" is not zero, the specified time in each command-time pair is changed by a random amount within the range of zero to "±P" multiplied by the specified time. To increase the percentage "P", the operator of the computer 31 "clicks" on part 83*b*, and to decrease the percentage P, the operator "clicks" on part 83*c*.

As a numerical example of the above, suppose that the percentage P is set to 12% by button 83, and suppose that the specified time in one particular command-time pair in the script S(z) is "10-seconds". Then, the time interval that occurs between the command of that particular command-time pair and the command of the next command-time pair will be 10-seconds plus an amount that is selected randomly within the range of −1.2 seconds to +1.2 seconds. Also, this amount will be selected randomly each time a simulated control terminal sends the command from that one particular command-time pair.

Button 84 is called "START", and it has two parts 84*a* and 84*b*. When part 84*a* is "clicked" by the operator of computer 31, the simulator program 32 sends VCR-like commands from the simulated control terminals to the video server 12. These commands begin with the first command of each script and continue in the sequence, and with the time-spacings, that were specified via the buttons 61-62, 71-72, and 81-83. Parts 84*b* displays the total time that elapses while these VCR-like commands are being sent.

Button 85 is called "PAUSE". When button 85 is first "clicked" by the operator of computer 31, the simulator program 32 stops sending the VCR-like commands from the simulated control terminals to the video server 12. Thereafter, when the START button 84 is "clicked" by the operator of computer 31, the simulator program 32 continues to send the VCR-like commands to the video server 12. The command-time pairs in each script where this continuation begins is the same as if the above pause did not occur. Also, during the above pause, the elapsed time that is displayed in part 84*b* does not change.

Button 86 is called "STOP". When Button 86 is "clicked" by the operator of computer 31, the simulator program stops sending the VCR-like commands from the simulated control terminals to the video server 12. This sending of the VCR-like commands can be restarted by "clicking" on the START button 84; and when that is done, the commands that are sent begin with the first command of each script.

Figure 7:
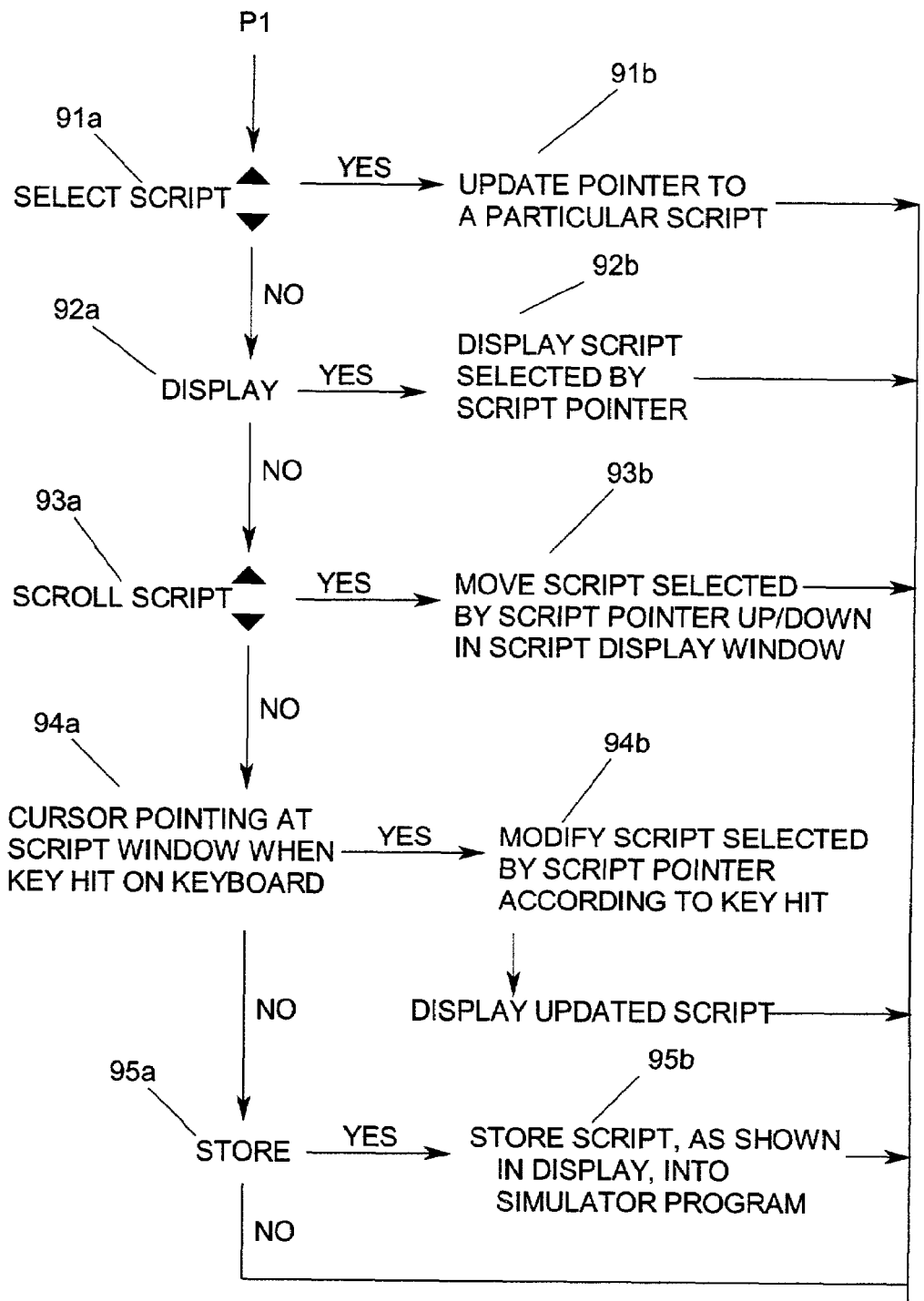
FIG. 7 shows various steps which are performed by the computer of FIG. 2 in response to an operator "clicking" on a subset of the buttons in FIG. 6 that are used to define each sequence of VCR-like commands.

All of the operations which are initiated via buttons 61-62 in FIG. 6, are illustrated in a flow chart form in FIG. 7. These operations are performed by computer 31 as steps 91*a*, 91*b*, 92*a*, 92*b*, 93*a*, 93*b*, 94*a*, 94*b*, 95*a*, and 95*b*.

In step 91*a*, computer 31 senses whether button 81*b* or 81*c* is being "clicked". If the "yes" path is taken, then computer 31 performs step 91*b* wherein it updates an internal pointer which selects one particular script S(z). The number "z" of that script is displayed by part 61*a* of FIG. 6.

In step 92*a*, computer 31 senses whether button 62*a* is being "clicked". If the "yes" path is taken, then computer 31 performs step 92*b* wherein it displays the script S(z) that was selected last by step 91*b*. This display occurs in part 62*b* of FIG. 6.

In step 93*a*, computer 31 senses whether any of the buttons 62*c* and 62*d* are being "clicked". If the "yes" path is taken, then computer 31 performs step 93*b* wherein it scrolls the script S(z) upward or downward in the display 62*b* of FIG. 6.

In step 94*a*, computer 31 senses whether any key on the keyboard 31*c* is being hit while a cursor is pointing at the script in the display 62*b*. If the "yes" path is taken, then computer 31 performs step 94*b* wherein it modifies the script S(z) at the point where the cursor points, according to the key that is hit.

In step 95*a*, computer 31 senses whether button 62*e* is being "clicked". If the "yes" path is taken, then computer 31 performs step 95*b* wherein it stores the script S(z), as shown in the display 62*b*, in a storage area within the simulator program 32.

Figure 8:
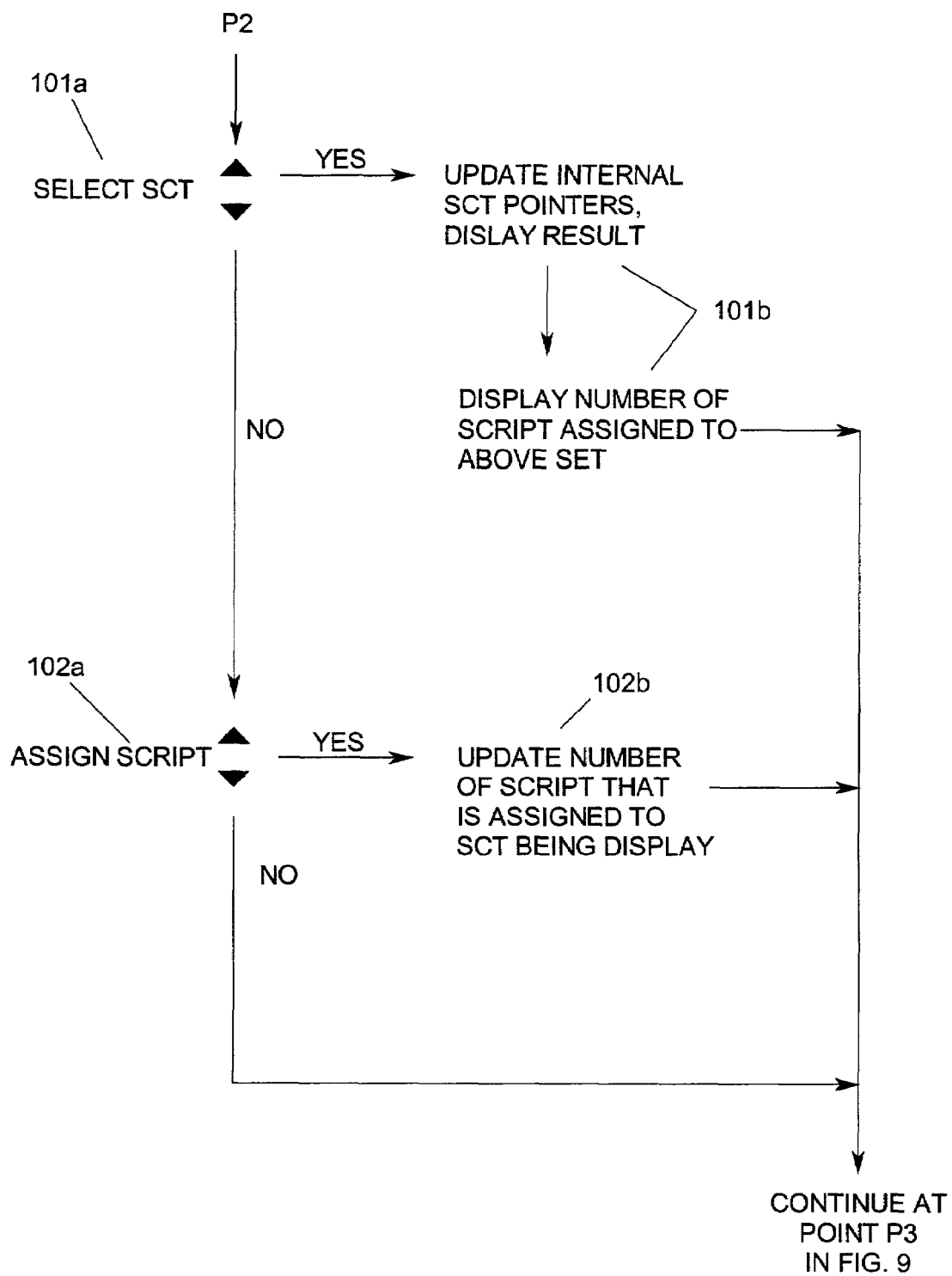
FIG. 8 shows various steps which are performed by the computer of FIG. 2 in response to an operator "clicking" on a subset of the buttons in FIG. 6 that are used to assign a particular sequence of VCR-like commands to a particular simulated control terminal.

Similarly, all of the operations which are initiated via buttons 71-72 in FIG. 6, are illustrated in a flow chart form in FIG. 8. These operations are performed by computer 31 as steps 101*a*, 101*b*, 102*a*, and 102*b*; and they occur after the steps of FIG. 7.

In step 101*a*, computer 31 senses whether button 71*b* or 71*c* is being "clicked". If the "yes" path is taken, then computer 31 performs step 101*b* wherein it updates an internal pointer which selects one particular simulated control terminal SCT(x). Then, the number "x" of that simulated control terminal is displayed by part 71*a* of FIG. 6. Also, the number "z" of any script which is currently assigned to the simulated control terminal SCT(x) is displayed in part 72*a* of FIG. 6.

In step 102*a*, computer 31 senses whether button 72*b* or 72*c* is being "clicked". If the "yes" path is taken, then computer 31 performs step 102*b* wherein it updates the number "z" in an internal pointer which identifies the script S(z) that is assigned to the simulated control terminal SCT(x). Also, the number "z" in that pointer is displayed in part 72a of FIG. 6.

Figure 9:
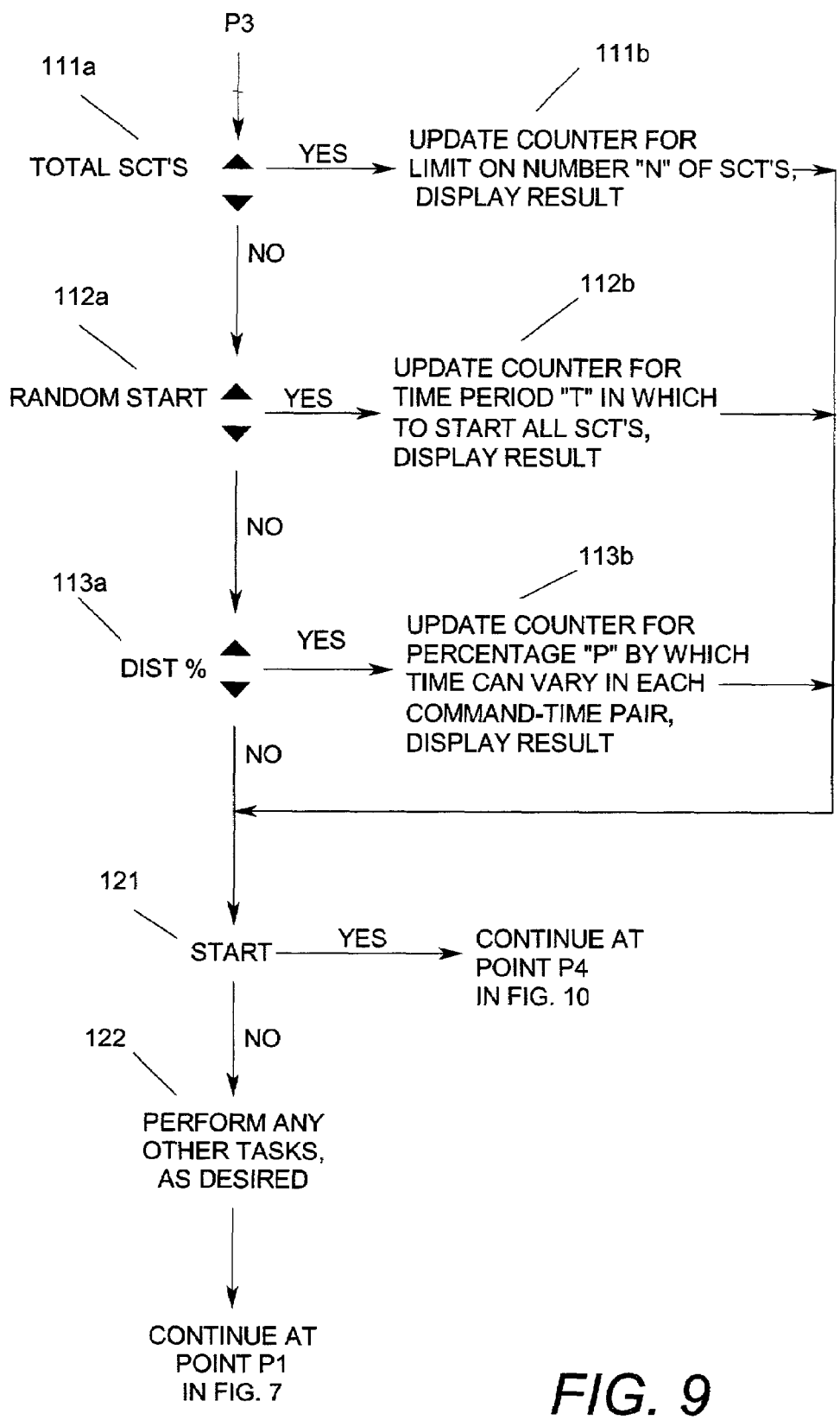
FIG. 9 shows various steps which are performed by the computer of FIG. 2 in response to an operator "clicking" on a subset of the buttons in FIG. 6 that are used to establish certain run-time parameters for the simulated control terminals.

Likewise, all of the operations, which are initiated via buttons 81-83 in FIG. 6, are illustrated in a flow chart form in FIG. 9. These operations are performed by computer 31 as steps 111a, 111b, 112a, 112b, 113a, and 113b; and they occur after the steps of FIG. 8.

In step 111a, computer 31 senses whether button 81b or 81c is being "clicked". If the "yes" path is taken, then computer 31 performs step 111b wherein it updates an internal counter which limits the number "N" of simulated control terminals that will be allowed to send commands to the video server 12. Also, the number "N" in that internal computer is displayed in part 81a of FIG. 6.

In step 112a, computer 31 senses whether button 82b or 82c is being "clicked". If the "yes" path is taken, then computer 31 performs step 112b wherein it updates the time period "T" in an internal counter. "T" is the time periods during which the simulated control terminals SCT(1) thru SCT(N) send their first command to the video server. This time period "T" is displayed in part 82a of FIG. 6.

In step 113a, computer 31 senses whether any of the buttons 83b or 83c are being "clicked". If the "yes" path is taken, then computer 31 performs step 113b wherein it updates the distribution percentage "P" in an internal counter. "P" is the percentage by which the specified time in each command-time pair will automatically be altered by the simulator program 31. The percentage "P" is displayed by part 83a in FIG. 6.

Following the above-described steps of FIG. 9, the simulator program 31 performs steps 121 and 122. In step 121, computer 31 senses whether the START button 84a is being "clicked". If the "no" path is taken, then step 122 is performed wherein computer 31 performs any other tasks which are desired and then branches back to step 91a of FIG. 7. Due to that branch, all of the steps of FIGS. 7, 8 and 9 are performed over and over in a loop.

Figure 10:
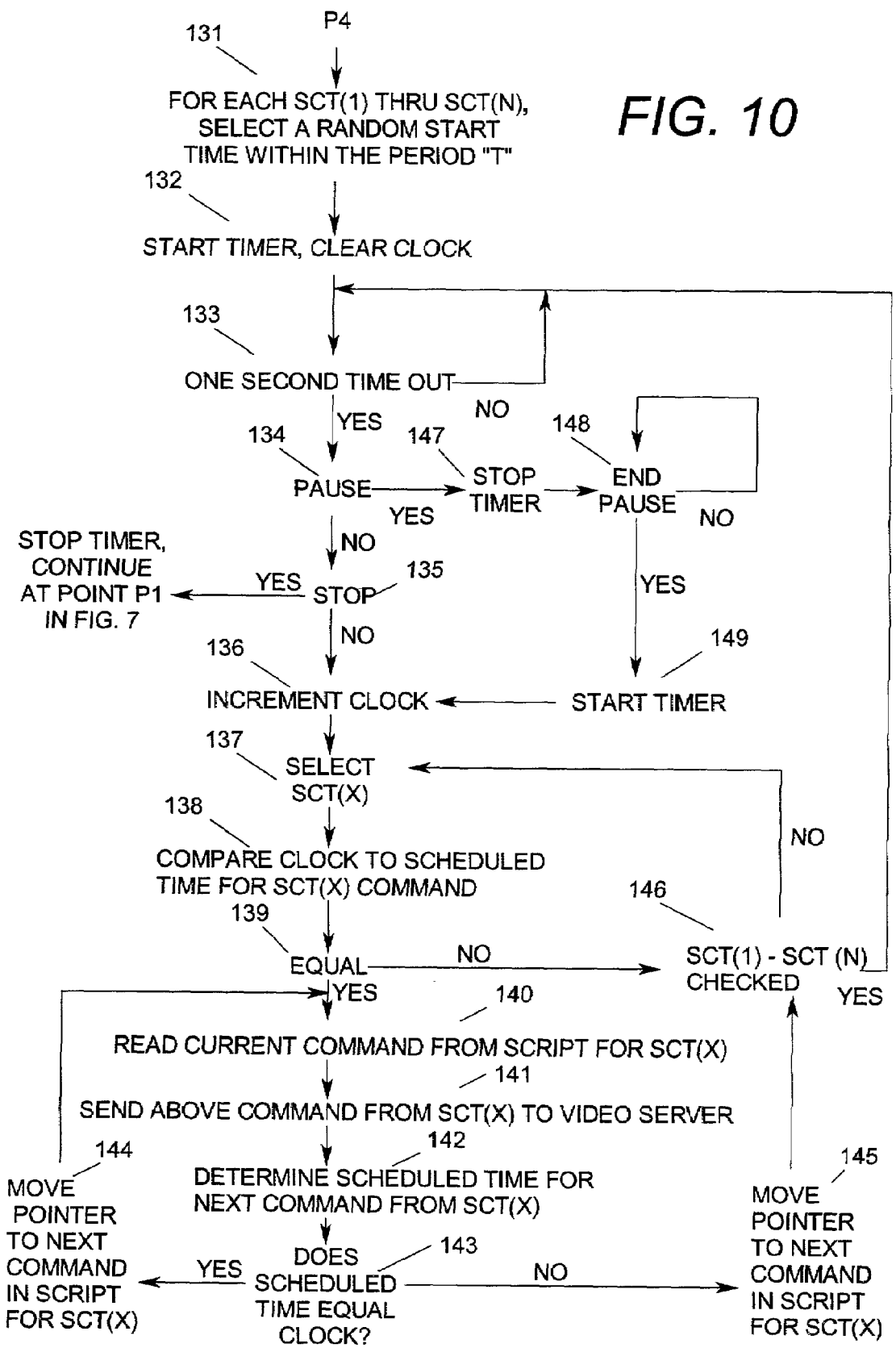
FIG. 10 shows various steps which are performed by the computer of FIG. 2 in response to an operator "clicking" on a subset of the buttons in FIG. 6 that are used to START, PAUSE, and STOP the generation of output signals from the simulated control terminals, in accordance with the command sequences and parameters that were previously established in FIGS. 7-9.

If that "yes" path is taken in step 121, then computer 31 performs all of the steps 131-149 that are shown in FIG. 10. In step 131, computer 31 selects a random start time, within the time period "T", for each of the simulated control terminals SCT(1) through SCT(N). Here, "N" is the number that was previously selected via button 81, and "T" is the time period that was previously selected via button 82.

Next in step 132, computer 31 clears an internal clock to zero and starts an internal timer. This timer operates in a cyclical fashion and generates a time-out signal each time a predetermined time interval ends. When such a time-out occurs, the "yes" path is taken in step 133. In FIG. 10, the time-out interval is one-second, as an example.

Next, in step 134, computer 31 senses whether the PAUSE button 85 in FIG. 6 is being "clicked". When such an event occurs, then a branch is taken to step 147; otherwise, a branch is taken to step 135.

Assume for now that the branch to step 135 is taken. Then, in step 135, computer 31 senses whether the STOP button 86 in FIG. 6 is being "clicked". When that occurs, then the internal timer is stopped and a branch is taken back to point P1 in FIG. 7. Otherwise, a branch is taken to step 136.

Assume now that the branch to step 136 is taken. Then, in step 136, computer 31 increments by one the number that is currently in the internal clock. That number was cleared to zero in step 132, and it is incremented in step 136 each time the one-second timer times out. Thus the number in the internal clock equals the total number of seconds that have lapsed since the START button 84 was clicked back in step 121 of FIG. 9.

Next, in step 137, computer 31 selects one particular simulated control terminal SCT(x). Then, step 138 is performed wherein computer 31 compares the internal clock to the "scheduled time" for the command that is to be sent next from the simulated control terminal SCT(x).

The first command in the script S(z) for the simulated control terminal SCT(x) has a scheduled time that is selected randomly by step 131. The second command in the script S(z) for terminal SCT(x) has a scheduled time which equals the scheduled time of the first command, plus the time in the first command-time pair of the script S(z) as modified by the distribution percentage "P". In more general terms, the i-th command in the script S(z) for terminal SCT(x) has a scheduled time which equals the scheduled time of command i–1, plus an increment Δt. Here, Δt is the time in the command-time pair i–1 of the script S(z) as modified by the distribution percentage "P".

If the internal clock "equals" the scheduled time for the command that is to be sent next from the simulated control terminal SCT(x), then a branch is taken from step 139 to step 140. Otherwise, a branch is taken from step 139 to step 146.

In the above step 139, an "equality" occurs if the number of seconds in the internal clock is the same as the number of whole seconds in the scheduled time for the command. Any partial second in the scheduled time for the command is disregarded in the comparison.

In step 140, computer 31 reads the script S(z) to obtain the command that is to be sent next from the simulated control terminal SCT(x). Then in step 141, computer 31 generates output signaling on cable 33 to the video server 12, which includes the above VCR-like command and the identity of the simulated control terminal SCT(x) which is sending the command.

Thereafter, in step 142, computer 31 determines the scheduled time for the command that follows the command which was just sent from the simulated control terminal SCT(x). This is done by incrementing the scheduled time of the command that was just sent by the amount Δt, as was described above in conjunction with step 138.

Next in step 143, computer 31 checks whether the scheduled time that was determined above in step 142 "equals" the time in the internal clock. If it does, then a branch is taken to step 144. Otherwise, a branch is taken to step 145. Here again, any partial second in the scheduled time is disregarded.

In step 144, computer 31 updates an internal pointer for the simulated control terminal SCT(x) such that it points to the command in the script S(z) which terminal SCT(x) should send next. Then, a branch is taken to step 140, whereupon all of the steps 140-143 are repeated.

Suppose now that back in step 143, a branch is taken to step 145. There, in step 145, computer 31 updates the internal pointer for the simulated control terminal SCT(x) such that it points to the command in the script S(z) which terminal SCT(x) should send next. Then, step 146 is performed wherein computer 31 checks whether step 138 has been performed for each of the simulated control terminals SCT(1) through SCT(N).

If the "No" path is taken in step 146, then a branch occurs to step 137 wherein computer 31 selects another one of the simulated control terminals SCT(1) through SCT(N). Then, all of the steps 138-143 are repeated for that newly selected simulated control terminal.

If the "yes" path is taken in step 146, then a branch occurs to step 133. There, computer 31 waits for the next time-out of the internal timer. Then, when the time-out occurs, computer 31 again performs the above described steps 134-146.

Next, consider the steps 147-149 which occur in FIG. 10 in response to the PAUSE button 85 of FIG. 6. When the PAUSE button 85 is "clicked" for the first time, computer 31 branches from step 134 to step 147. There, computer 31 stops the internal timer which was started in step 132. Then step 148 is performed wherein computer 31 waits for the START button 84 to be "clicked". When that occurs, computer 31 restarts the internal timer as step 149, and then a branch is taken to step 136 (which was previously described).

Figure 11:
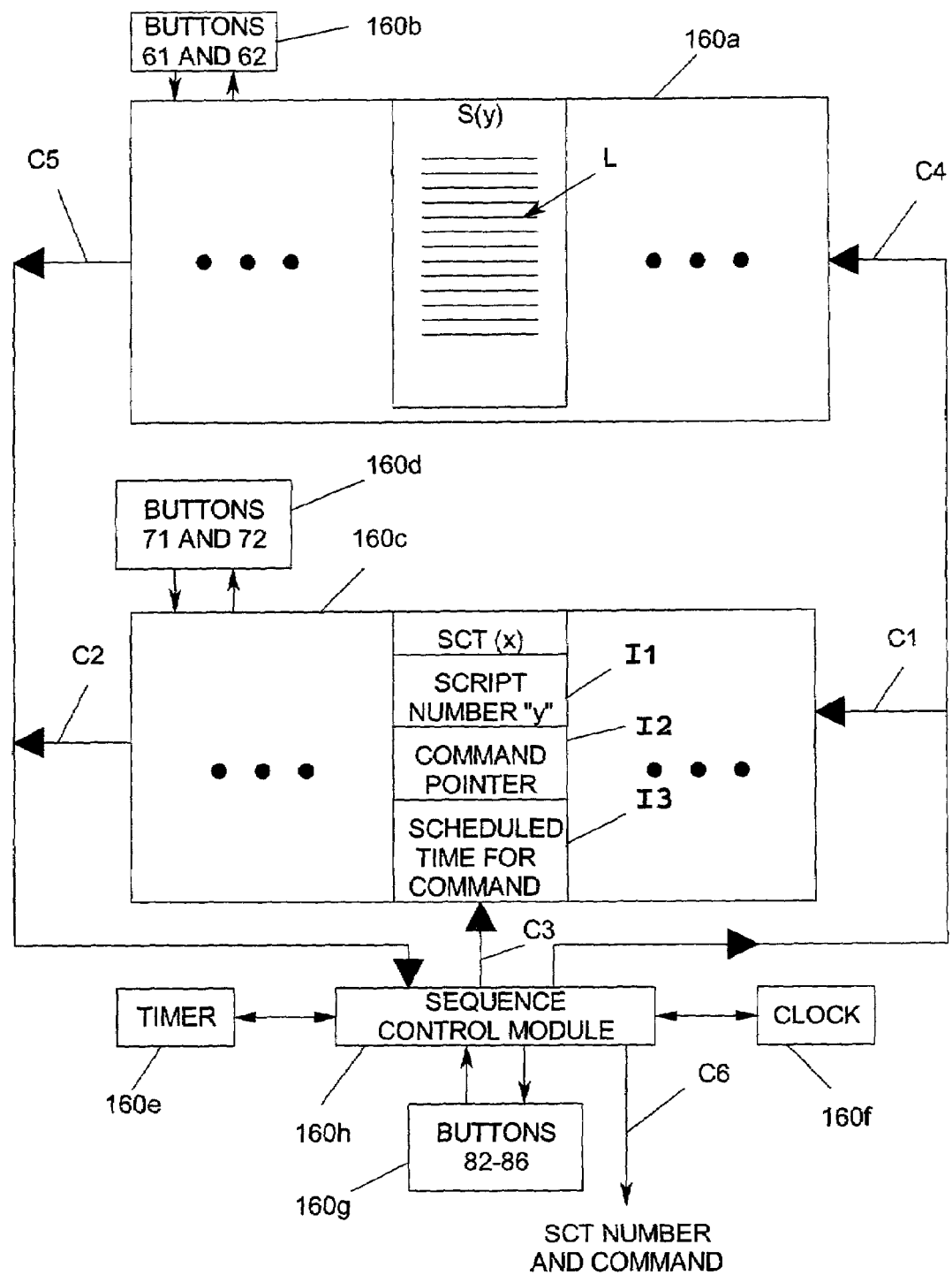
FIG. 11 shows the structure of a program in the computer of FIG. 2 which performs the steps that are shown in FIGS. 7-10.

Referring now to FIG. 11, an overall structure for the simulator program 32 will be described which performs all of the steps in FIGS. 7-10. In this FIG. 11 structure, the major components of the simulator program 32 are identified by reference numerals 160a through 160h. Each of these program components is described below in TABLE 4, and these components are intercoupled to each other as shown in FIG. 11.

TABLE 4

1) Component 160a is a portion of the simulator program 32 which stores all of the scripts. In FIG. 11, only one particular script S(y) is illustrated within component 160a, as an example. All other scripts are represented by a series of dots within component 160a. Also, within the script S(y), each of the lines L represent a single command-time pair in that script.
2) Component 160b is a portion of the simulator program 32 which displays and interacts with buttons 61 and 62 of FIG. 6. By this interaction, component 160b performs all of the steps 91a through 95b, that were previously described in conjunction with FIG. 7, to write and read and modify each script in component 160a.
3) Component 160c is a portion of the simulator program 32 which stores three items I1, I2, and I3 for each of the simulated control terminals. In FIG. 11, those three items are shown for only one particular simulated control terminal SCT(x), as an example. These items I1, I2 and I3 for all of the other simulated control terminals are represented by a series of dots within component 160c. Item I1 is the identity of the script S(y) that is assigned to the simulated control terminal SCT(x). Item I2 is a pointer which points to one command in the script S(y) that is to be sent next from the simulated control terminal SCT(x). Item I3 is the scheduled time at which the simulated control terminal SCT(x) will send the command that is pointed to by item I2.
4) Component 160d is a portion of the simulator program 32 which displays and interacts with buttons 71 and 72 of FIG. 6. By this interaction, component 160d performs all of the steps 101a through 102b, that were previously described in conjunction with FIG. 8, which assign a script to each simulated control terminal.
5) Component 160e is a portion of the simulator program 32 which provides an interval timer. This is the timer that was previously referred to in conjunction with the description of steps 132 and 133 in FIG. 10.
6) Component 160f is a portion of the simulator program 32 which provides an interval clock. This is the clock that was previously referred to in conjunction with the description of steps 136 and 138 of FIG. 10.
7) Component 160g is a portion of the simulator program 32 which displays all of the buttons 81-86 of FIG. 6, and which senses when these buttons are being "clicked".
8) Component 160h is a portion of the simulator program 32 which sequentially performs all of the steps of FIG. 9 and all of the steps of FIG. 10. Thus in FIG. 11, component 160h is labeled "sequence control module".

Stored within the sequence control module 160h are the previously described parameters "T", "N", and "P". The values of these parameters are set via the buttons 81, 82 and 83 of FIG. 6; and they are used, after the START button 84 is "clicked", to perform the steps which are shown in FIG. 10.

Also to perform the steps which are shown in FIG. 10, the sequence control module 160h can read items I1, I2 and I3 from component 160c, for any one particular simulated control module SCT(x). To do that, the sequence control module 160h sends the number "x" to component 160c via a connection C1; and then in response, component 160c sends items I1, I2 and I3 for module SCT(x) via a connection C2. Similarly, to modify items I2 or I3 for module SCT(x), the sequence control module 160h sends the number "x" to component 160c via the connecting C1 and concurrently sends the modification to component 160c via a connection C3.

Also, to perform the steps which are shown in FIG. 10, the sequence control module 160h can selectively read any one command-time pair from any one-particular script S(z) in component 160a. To do that, the sequence control module 160h sends the script number "z" and the item I2 command pointer to component 160a via a connection C4. Then in response, component 160a sends the corresponding command-time pair to the sequence control module 160h via a connection C5.

Output signals from the sequence control module 106h are generated on a connection C6, which in turn is coupled to the video server 12 via the cable 33. These output signals are the VCR-like commands from the simulated control terminals that are generated in step 141 of FIG. 10.

One preferred embodiment of the simulator program 32, which simulates a plurality of control terminals in the "script" mode of operation, has now been described in detail. Also, one preferred embodiment of the simulator program 32, which simulates a plurality of control terminals in the "manual" mode of operation, was previously described in detail in conjunction with FIGS. 2-5. In addition, however, various changes and modifications can be made to the details of these embodiments without departing from the nature and spirit of the invention.

For example, in step 53b of FIG. 4 and step 141 of FIG. 10, the simulator program 32 sends the VCR-like commands from the simulated control terminals to the video server 12; and, those commands can be sent in any format, as desired. One format can consist of the identity "x" of the simulated control terminal SCT(x) which is sending the command, followed immediately by the command itself. Another format can include a code which indicates the "type" of control terminal that is being simulated, such as the touch-tone telephone or the personal computer or the special purpose hardware that was described in the "BACKGROUND OF THE INVENTION". Further, the format can vary depending upon the type of control terminal that is being simulated.

Figure 12:
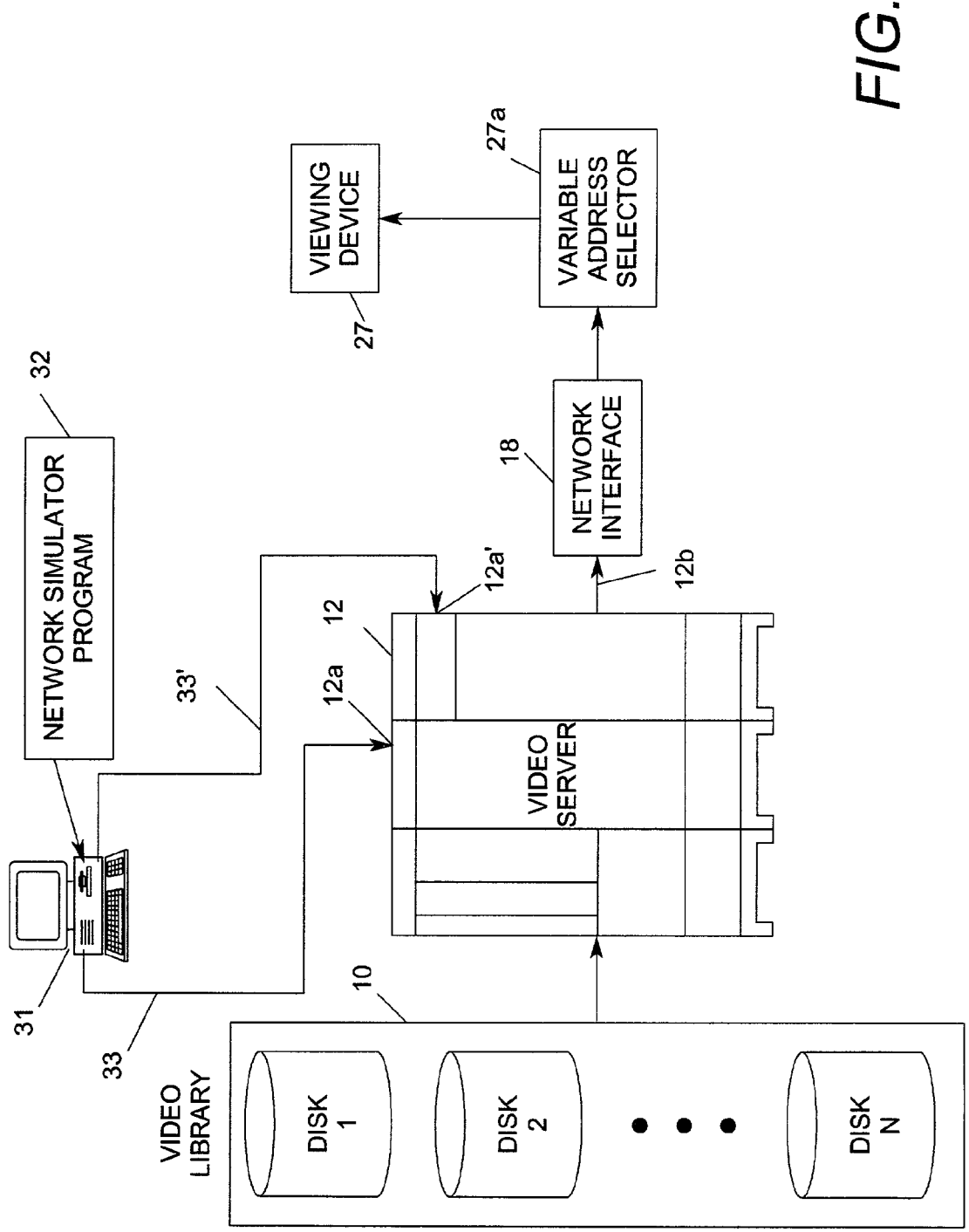
FIG. 12 shows a computer which tests a video server, for the video-on-demand system of FIG. 1, by incorporating two particular modifications into the testing of FIG. 2.

Also, as another modification, the simulator program 32 can be used to test both the video server 12 and the network interface 18 of FIG. 1. This modification is illustrated in FIG. 12. There, the output of the video server 12 is coupled to the input network interface 18, and the output of the network interface 18 is coupled through a variable address selector 27a to the viewing device 27. Each video data stream from the output of the network interface 18 is addressed to one particular viewing device. By selecting one particular address via the variable address selector 27a, the corresponding video stream will be displayed by the viewing device 87.

Similarly, as another modification, the output signals from step 53b of FIG. 4 and step 141 of FIG. 10, can be generated in a form which normally occurs at some predetermined intermediate point within the video server 12 itself. With this modification, any processing within the video server 12 which precedes the intermediate point will be bypassed. This modification is illustrated in FIG. 12 by a cable 33' which couples to the video server 12 via an intermediate port 12a'.

As an example of the above, suppose that the video server 12' receives the signals from the electronic feedback equipment 29 of FIG. 2 in one particular form F1; and suppose further that the video server 12 initially processes those signals by transforming them to a completely different form F2. Then, to bypass that transformation process within the video server 12, the simulator program 32 can generate its output signals on cable 33' in the form F2 via step 53b of FIG. 4 and step 141 of FIG. 10.

The above bypassing of some initial processing within the video server 12 is particularly useful where the video server 12 is comprised of two or more modules which are intercoupled in series. Then, to bypass the first "k" modules of the series, the simulator program 32 simply generates its output signals on cable 33' in the form that signals are sent from the k-th module to the next module.

Further, as another modification, the simulator program 32 can take various alternative actions each time the command which it sends from terminal SCT(x) in step 141 of FIG. 10, is the last command of the script S(y) for that terminal. As one alternative, the simulator program 32 can simply stop sending any more commands from the simulated control terminal SCT(x). As another alternative, the simulator program 32 can continue to send all of the commands in the script S(y) in a loop, from the simulated control terminal SCT(x).

In addition, as still another modification, various instructions for directing the simulator program actions can be incorporated into each script. For example, the instruction can direct the simulator program 32 to decrement an internal count and perform conditional jumps from one command-time pair to another when the count reaches zero. With such instructions, any subset of the command-time pairs in a script can be repeated, in a loop, a selectable number of times.

Accordingly, it is to be understood that the present invention is not limited to each detail of the illustrated preferred embodiments, but is defined by the appended claims.

What is claimed is:

1. A method of testing a video server for a video-on-demand system, said method including the steps of:

storing, in a single computer, respective current states for each of several simulated control terminals, where each current state identifies a movie that was last requested by the corresponding simulated control terminal and a VCR-like command that was last sent from the corresponding simulated control terminals;

displaying, on a visual monitor connected to said computer, 1) a pointer for selecting any one particular simulated control terminal, 2) the current state of the selected simulated control terminal, and 3) a set of control buttons for requesting any one of several movies and for sending VCR-like commands;

performing a first manual step, by an operator of said computer, which consists of clicking a mouse that is coupled to said computer while placing a cursor on said pointer;

responding immediately within said computer to said first manual step by—a) selecting another simulated control terminal via said pointer, and b) displaying on said visual monitor the current state of said another simulated control terminal;

performing a second manual step, by said operator, which consists of clicking said mouse while placing said curser on a particular one of said control buttons;

responding immediately within said computer to said second manual step by—a) generating an output signal from said computer to said video server which represents said one particular control button and which identifies said another simulated control terminal, b) updating the current state for said another simulated control terminal, and c) displaying on said visual monitor the updated current state; and, repeatedly performing, by said operator, only said first and second manual steps in a sequence.

2. A method according to claim 1 wherein said stop of repeatedly performing, by said operator, only said first and second manual steps in a sequence includes the sub-step of performing said first manual stop one time followed by performing said second manual stop multiple times.

3. A method according to claim 1 wherein said step of repeatedly performing, by said operator, only said first and second manual steps in a sequence includes the sub-stop of performing, multiple times, said first manual stop followed by said second manual step.

4. A method according to claim 1 which further includes the steps of generating said output signals in a form which is a processed version of signals that said video server normally receives on one port from actual control terminals, and sending those output signals from said computer directly to said video server over a cable which plugs into another port on said video server.

5. A method according to claim 1 which further includes the steps of generating said output signals in a form which said video server normally receives on one port from actual control terminals, and sending those output signals from said computer directly to said video server over a cable which plugs into said one port.

6. A method according to claim 1 wherein said displaying stop includes the sub-stop of displaying three particular parts for said pointer; where the first part shows a number which identifies one particular simulated control terminal that is selected, the second part is a control button for increasing said number, and the third part is a control button for decreasing said number.

7. A method according to claim 1 wherein said displaying stop includes the sub-step of displaying four particular parts for selecting any one of said several movies; where the first part shows a number which identifies one particular movie, the second part is a control button for increasing said number, the third part is a control button for decreasing said number, and the fourth part is a control button to request the movie identified by said number.

8. A method according to claim 1 wherein said storing step includes the sub-stop of identifying, in said current state, a VCR-like command which is selected from the command set of PLAY, PAUSE, STOP, SKIP FORWARD, PLAY FORWARD, SKIP REVERSE, and PLAY REVERSE.

9. A method according to claim 1 wherein said storing stop includes the sub-step of storing, in said computer, said respective states for at least one-hundred of said simulated control terminals.

10. An electronic storage media, readable by a single computer, on which a program is recorded that directs said computer to perform a method of testing a video server which includes the steps of:

storing, in said computer, respective current states for each of several simulated control terminals, where each current state identifies a movie that was last requested by the corresponding simulated control terminal and a VCR-like command that was last sent from the corresponding simulated control terminals;

displaying, on a visual monitor connected to said computer, 1) a pointer for selecting any one particular simulated control terminal, 2) the current state of the selected simulated control terminal, and 3) a set of control buttons for requesting any one of several movies and for sending VCR-like commands;

sensing a first manual operation, by an operator of said computer, which consists of clicking a mouse that is coupled to said computer while placing a curser on said pointer;

responding immediately within said computer to said first manual operation by—a) selecting another simulated control terminal via said pointer, and b) displaying on said visual monitor the current state of said another simulated control terminal;

sensing a second manual operation, by said operator, which consists of clicking said mouse while placing said curser on a particular one of said control buttons;

responding immediately within said computer to said second manual operation by—a) generating an output signal from said computer to said video server which represents said one particular control button and which identifies said another simulated control terminal, b) updating the current state for said another simulated control terminal, and c) displaying on said visual monitor the updated current state; and, repeatedly performing, by said computer, said sensing steps and the corresponding responding steps.

* * * * *